(12) United States Patent
Germanus

(10) Patent No.: US 6,362,473 B1
(45) Date of Patent: Mar. 26, 2002

(54) METHOD FOR MANAGEMENT OF DAUGHTER ION SPECTRA OVER SEVERAL GENERATIONS

(75) Inventor: Andreas Germanus, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 09/406,898

(22) Filed: Sep. 28, 1999

(30) Foreign Application Priority Data

Oct. 5, 1998 (DE) .......................... 198 45 700

(51) Int. Cl.⁷ .............................................. H01J 49/00
(52) U.S. Cl. ...................................................... 250/282
(58) Field of Search .......................................... 250/282

(56) References Cited

U.S. PATENT DOCUMENTS 5,903,003 A * 5/1999 Schubert et al. ............ 250/282

FOREIGN PATENT DOCUMENTS

| JP | 10293120 | 11/1998 |
| WO | WO 96/08034 | 3/1996 |

* cited by examiner

*Primary Examiner*—Kiet T. Nguyen

(57) ABSTRACT

A method of managing the data for a plurality of ion spectra, including at least one progenitor ion spectrum and a plurality of spectra of ion fragments that are descendants of the progenitor ion, stored in a memory includes displaying indicia of the spectra on a display screen in a graphical user interface such that descendant ions have indicia that are displayed as subordinate to indicia of their progenitor ions, and manipulating the spectra data by selection of the displayed indicia with a graphical user interface device. The indicia are organized in a hierarchical tree structure.

11 Claims, 1 Drawing Sheet

METHOD FOR MANAGEMENT OF DAUGHTER ION SPECTRA OVER SEVERAL GENERATIONS

FIELD OF THE INVENTION

The invention relates to a method for the management of fragment ion spectra of a progenitor ion for any number of isolation and fragmentation generations, whereby the management comprises the preparation of the measurement of a spectrum, as well as memory management and the recalling of fragment ion spectra of a progenitor ion.

BACKGROUND OF THE INVENTION

High frequency quadrupole ion traps as invented by Wolfgang Paul consist of a high-frequency supplied ring electrode and two end cap electrodes; ions can be stored inside. The ion traps can be used as a mass spectrometer by ejecting the ions selectively according to mass and measuring them by means of secondary-electron multipliers. There are several different methods known for ion ejection, which will not be discussed here in any further detail. Ion cyclotron resonance mass spectrometers are a different type of ion trap in which ions can be stored in a magnetic field of high constancy and additional electric fields. Here—after excitation—the circular movements of ions can be used to measure the ratio of their mass to their charge.

Ion trap mass spectrometers have special features which make their use interesting for many types of analysis procedures. In particular, selected ion types (so-called "parent ions") can be isolated in the ion trap (freed of all other ion types and stored alone) and, with the help of a damping or collision gas, can be fragmented by molecular collisions after excitation of their oscillating movements. This excitation to fragmentation occurs, for example, in quadrupole ion traps by applying an alternating current of an appropriate frequency to the end caps. The spectra of these fragment ions are known as "daughter ion spectra" of the associated parent ions.

These daughter ion spectra contain information about the molecular structure of the ejected parent ions since they have come from them as fragments. "Granddaughter ion spectra" can also be measured as fragment ion spectra of selected daughter ions. In this way the structural information is increased. In favorable cases, it is possible to measure such fragment ion spectra up to the tenth generation and beyond. The original ion for this sequence of generations is called a "progenitor ion" here.

Although each individual spectrum measured in such a way offers only relatively little information regarding the structure of the original ions, the entirety of all fragment ions of a progenitor ion does contain a large amount of structural information about the progenitor ion, particularly for the reason that the relationship of the origin of the fragment ions among each other is known. For good structural determination of the progenitor ion, however, it is generally necessary to measure, store and evaluate a larger number of fragment ion spectra.

Preparing the measurement method for these daughter ion spectra over several generations is laborious and has been possible up to now only interactively on the video screen during the measurements. For this purpose, daughter ion spectra are measured and visually evaluated. The user decides, based on his experience, from which daughter ion type he wishes to measure a granddaughter ion spectrum. He derives the mass of these daughter ion types from the representation of the daughter ion spectrum on the screen, then he enters this mass into a table (or subtable) for measurement of granddaughter ions. Once the granddaughter ion spectrum has been measured, he then possibly continues to measure several great-granddaughter ion spectra of several granddaughter ion types from the granddaughter spectrum.

This method is relatively simple if only one single spectrum each from the next generations is to be measured. The table is then linear, and every line corresponds to a generation. However, the method becomes very complicated if several fragment ion spectra of several (sister) ion types also need to be measured in every generation. That is why suppliers of mass spectra offer prepared table structures for some selected cases, but these fall far short of the actual demand.

The fast interactive control of measurement methods using "intuitive actions" via the monitor is becoming more and more important in mass spectrometric application areas. The software with the simplest and clearest operation is increasingly the deciding factor when buying an expensive spectrometer.

Here, "intuitive actions" signify those control actions which are so easily accessible to the user that he can remember and perform them independently after seeing them once, and thus require very little effort. Especially significant are those actions which are also performed in the same, or at least a similar way, in other programs which the operator uses daily.

The interactive control of complex measurement and evaluation methods is frequently conducted using the mouse. However, a changeover to keyboard operation is often unavoidable with the prior art in those methods, for example when a daughter ion spectrum must be scanned for an ion type depicted as a mass spectrometric peak. It is then necessary, with the prior art, to read the mass of the ion peak (for which there are usually mouse-controlled tools in specific display windows) and to enter this mass in a table for scanning fragment or daughter ions.

The changeover from mouse to keyboard for these interactive controls is felt to be bothersome, slow and nonergonomic to an increasing degree.

OBJECTIVE OF THE INVENTION

It is the objective of the invention to find an input and management method for the measurement, storage and retreaval of fragment ion spectra from a progenitor ion over several generations that can also handle family tree structures of any complexity, that can be controlled in a simple manner via the mouse, if possible, and which is very easy for the user to understand.

SUMMARY OF THE INVENTION

It is the basic idea of the invention to use the well-known "tree view", used to manage files in directories and subdirectories, likewise to manage fragment ion spectra of the descendant (or offspring) ions from a progenitor ion, and to easily prepare measurement methods for such fragment ion spectra. Thus it becomes easy to manage fragment ion spectra through several isolation and fragmentation generations, and to retrieve the stored spectra. Closer observation shows that the family trees of daughter and granddaughter spectra have the same structure as those of files in directories and subdirectories, and the setup and retrieval structures are similar. Tools and graphic representations for the file structures are readily available. The user is well acquainted with the display and use of the structures, for example from the File Manager (Windows 3.11) or Explorer (Windows 95, Windows 98 and Windows NT) from Microsoft, but also from many other programs. Each file has its exact position in a directory hierarchy which can be opened and closed in its representation by tree branches and branch generations. By clicking the mouse on the small box with a plus sign in the structure depicted by dotted lines, a further branch of the familiy tree can be opened to show a new generation of subdirectories.

It is a further idea of the invention to enter the notation of a fragment ion spectra automatically into this family tree. If a peak in an ion spectrum is clicked on, a context menu is opened in which the entries "Schedule daughter ion spectrum" and "Measure daughter ion spectrum" are located. If one of these entries is activated by clicking the mouse, an additional entry takes place automatically at the correct position in the family tree for the daughter ion spectrum. If the correct measurement mode has been switched on, or if the "Measure daughter ion spectrum" entry was activated, the corresponding spectrum is automatically measured. Alternatively, the peak of the mass spectrum can be simply dragged into the window for the daughter ion family tree simply by clicking on it and dragging it (with the mouse key depressed) into the tree view window. Once the mouse key is released, an entry is made at the correct position and, if the measuring mode is switched on, the spectrum is also measured automatically. The peak may need to be selected beforehand here by marking or highlighting, and this selection is also done using the mouse.

The entry may consist of a clickable icon and a text line which also contains the mass number. The mass number indicates the mass (in atomic mass units) of the direct parent ion for which this daughter ion spectrum is to be or was measured. The entries from daughter ion spectra of a parent ion are arranged according to these mass numbers. This parent ion can be of course, by itself, a daughter ion in a daughter ion spectrum of a higher-level parent ion (grandparent ion), that for its part may again be a daughter ion of a higher-level progenitor ion. The progenitor ion itself, together with other progenitor ions, may belong to a higher-level spectrum, and finally even several spectra may be displayed in this structure window.

Activating an icon for a daughter ion spectrum can trigger several actions, depending on the mode switched on. In a measuring mode for cyclical measurement of all fragment ion spectra, this activation means that the daughter ion spectrum belonging to the icon is to be displayed continuously without being interrupted by the display of other measured fragment ion spectra. Then, for example, further peaks may be selected for measurement of daughter ions. If no measurements are taking place, activation means that this spectrum has to be loaded from memory and displayed on the screen. In a measurement mode for a single measurement of fragment ion spectra, the activated fragment ion spectrum is measured once and displayed. In a measurement mode for repetitive measurements of a fragment ion spectrum, this spectrum is measured a number of times and averaged. Then a management window with input fields for the measurement parameters is displayed, via which the parameters for this measurement can be set and optimized.

Figure 1:
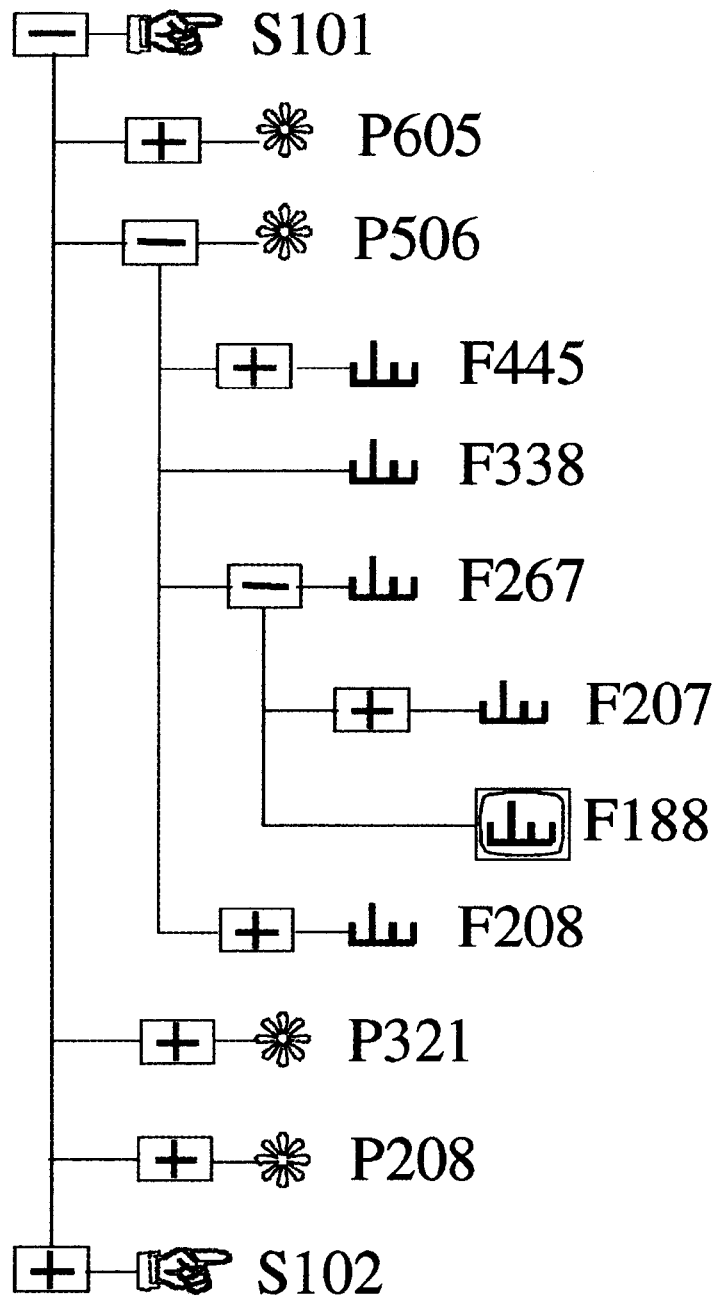
FIG. 1 shows the representation of a structure tree which contains two spectra, S101 and S102. The further structure for the S102 spectrum is not displayed, as indicated by the plus sign in the junction point for this spectrum. By clicking on the plus sign with the mouse, this branch of the family tree may also be opened. The two spectra can, for example, originate from a chromatographic or electrophoretic series of spectra.

For the S101 spectrum, fragment ion spectra from a total of four progenitor or parent ion types P605, P506, P321 and P208 are taken. For the progenitor ion P506, indicated by the minus sign in the junction point, the direct daughter ion spectra F445, F338, F267 and F208 are displayed. There are no fragment ion spectra of the next generation for the fragment ion spectrum F338, as indicated by the lack or plus of minus sign at the junction point.

For the fragment ion spectrum F267, the next branch is open, as indicated again by the minus sign at the junction point. By clicking on the minus sign, this part of the structure can be hidden, the minus sign is then converted into a plus sign in the normal way. For the fragment ion spectrum of ion types with a mass of 188 atomic mass units (amu or u), there is again no fragment ion spectrum of the next generation, as indicated by the lack of plus or minus sign. However, for this spectrum, the icon for this spectrum is replaced by the icon for the spectrum on the screen: this spectrum is currently being displayed on the screen.

Favorable Embodiments

With a daughter ion mass spectrum with ion peaks on the screen, the user would like to measure a granddaughter ion spectrum from one of the daughter ion peaks represented. In a favorable embodiment of the method according to the invention, the peak is selected within the daughter ion spectrum in a simple manner using the mouse, for example by clicking in a peak-free area to the right of peak maximum. In this way, the maximum of the peak is automatically sought and, for example, highlighted by a vertical line in a previously selected color. Subsequently, the user can click on the highlighting with the right mouse key; a so-called context menu then opens which has various entries. Two of the context commands are called "Schedule daughter ion spectrum" and "Measure daughter ion spectrum." If one of the these context commands is activated by a mouse click, a measurement method for this ion type is automatically set up and an icon with the adjacent mass number of the selected ion peak appears in the display of the tree view of all fragment ion spectra for the corresponding progenitor ion, as can be seen in the figure. The icon is designed in such a way that it indicates the preparation of a measurement method, but also shows that no spectrum has yet been measured. If the "Measure daughter ion spectrum" entry has been activated, a measurement takes place immediately and the resulting spectrum is stored, and the icon is changed so as to indicate the measurement of a spectrum. Measurement of a spectrum can also be triggered manually. Here too, the icon changes into a representation which indicates that a spectrum is now available.

It is even simpler to drag the selected peak into the representation window of the tree view. First the peak will be marked by the mouse and thus highlighted. The peak's highlighting is clicked on with the left mouse key and, without releasing the mouse key, dragged into the tree view window. Here, an entry for the fragment ion spectra is entered automatically at the correct location, and the measurement method is set up.

Opening the context dialog with the right mouse key conforms to the system using the rules of modern information technology. Setting up a measurement by clicking with the left mouse key and dragging a peak with the mouse does not conform to the system, but is extremely intuitive and simple. Since a spectrum peak has a fixed location within a spectrum and only makes sense there, the user certainly does not expect any unsensible moving of the graphic spectrum peak from this process. Rather, he intuitively expects that the correct action will follow.

The mouse action of "drag and drop" is accompanied here in a meaningful manner by transformation of the cursor. Thus the normally diagonal, upwards pointing cursor arrow is transformed when clicking a peak into a horizontal arrow and when dragging into the representation window of the tree view, it is transformed into a diagonal or straight downwards pointing arrow (as a symbol for "Release is possible and effective here").

Activating an icon for a daughter ion spectrum can trigger an action, which depends on the measurement or evaluation mode of the mass spectrometer. In a measuring mode for cyclical measurement of all fragment ion spectra, this activation means that the daughter ion spectrum belonging to the icon should be displayed continuously without being interrupted by the display of other measured fragment ion spectra. Then, for example, further peaks may be selected for measurement of daughter ions. In the evaluation mode, when no measurements usually take place, activation means that this spectrum must be loaded from memory and displayed on the screen. In a measurement mode for a single measurement of fragment ion spectra, the active fragment ion spectrum is measured once and displayed. In a measurement mode for repetitive measurements of a fragment ion spectrum, this spectrum is measured a number of times. The spectra may be averaged, either in bundles or with a running average. Then a management window, with input fields or slide controls for the measurement parameters, is displayed, by which the parameters for this measurement can be set and optimized.

These examples show only a small number of applications which are possible with the method according to the invention. The specialist in this field will easily be able to work out corresponding methods for his specific measurement or evaluation problem.

What is claimed is:

1. A method of managing the data for a plurality of ion spectra stored in a memory, the spectra including at least one progenitor ion spectrum and a plurality of spectra of ion fragments that are descendants of the progenitor ion, the method comprising:

displaying indicia of the spectra on a display screen in a graphical user interface (GUI) environment, the indicia being organized in a hierarchical tree structure, such that descendant ions have indicia that are displayed as subordinate to indicia of their progenitor ions; and enabling manipulation of the spectra data by selection of the displayed indicia with a GUI input device.

2. A method according to claim 1 wherein said manipulation of the spectrum data comprises initiating the display of a selected spectrum in a graphical format.

3. A method according to claim 1 wherein said manipulation of the spectrum data comprises storing a graphical representation of a selected spectrum.

4. A method according to claim 1 wherein said indicia include visual representations of mass numbers of ions represented by the spectra.

5. A method according to claim 1, wherein said selection of a particular one of the displayed indicia with a GUI device in a measurement mode of cyclically proceeding measurement of fragment ion spectra causes the fragment ion spectrum associated with the particular one of the displayed indicia to be displayed on the screen and regularly updated.

6. A method according to claim 1, wherein said selection of a particular one of the displayed indicia with a GUI device in a measurement mode for repetitive measurement of individual spectra causes the fragment ion spectrum associated with the particular one of the displayed indicia to be measured repeatedly and an average of the measurements used to generate a graphical display of the spectrum.

7. A method according to claim 6, further comprising displaying a management window on the screen when in the measurement mode for repetitive measurements of individual spectra, said management window having indicia selectable with the GUI device that, when selected, alter individual measurement parameters for the fragment ion spectrum.

8. A method according to claim 1, wherein selection of one of said indicia when in a measurement-free mode causes the associated fragment ion spectrum to be retrieved from memory and depicted on the screen.

9. A method according to claim 1, wherein the tree structure extends beyond a progenitor ion to higher-level spectra with several progenitor ions each.

10. A method according to claim 9, wherein the tree structure extends to chromatographic or electrophoretic spectrum runs with several spectra each.

11. A method according to claim 1 wherein, in a graphical display of a spectrum, selection of a peak in the displayed spectrum with the GUI device results in an updating of the tree structure to include indicia for an ion associated with said selected peak.

* * * * *